(12) United States Patent
Kobayashi et al.

(10) Patent No.: US 8,729,760 B2
(45) Date of Patent: May 20, 2014

(54) ROTOR OF ELECTRIC MOTOR HAVING STRUCTURE FOR ATTACHING MAGNET SECURELY TO OUTER CIRCUMFERENTIAL SURFACE OF ROTOR CORE AND MANUFACTURING METHOD THEREOF

(71) Applicant: FANUC Corporation, Yamanashi (JP)

(72) Inventors: Kouji Kobayashi, Yamanashi (JP); Takeshi Tamaki, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/761,343

(22) Filed: Feb. 7, 2013

(65) Prior Publication Data

US 2013/0214620 A1 Aug. 22, 2013

(30) Foreign Application Priority Data

Feb. 16, 2012 (JP) .................................. 2012-031604

(51) Int. Cl.
*H02K 1/27* (2006.01)
*H02K 1/28* (2006.01)
*H02K 21/14* (2006.01)

(52) U.S. Cl.
CPC .................. *H02K 1/28* (2013.01); *H02K 1/278* (2013.01); *H02K 21/14* (2013.01)
USPC ................... 310/156.28; 310/43; 310/156.08; 310/156.23; 310/156.29; 29/298

(58) Field of Classification Search
CPC .......... H02K 1/278; H02K 1/28; H02K 21/14
USPC .................... 310/43, 156.08, 156.23, 156.26, 310/156.28, 156.29; 29/598
IPC ................................................ H02K 1/27, 1/28
See application file for complete search history.

(56) References Cited

U.S. PATENT DOCUMENTS

| | | | | |
|---|---|---|---|---|
| 4,746,827 | A | * | 5/1988 | Ochiai et al. ............. 310/156.22 |
| 5,040,286 | A | * | 8/1991 | Stark ................................ 29/598 |
| 5,237,737 | A | * | 8/1993 | Zigler et al. .................... 29/598 |
| 5,345,669 | A | * | 9/1994 | Zigler et al. .................... 29/598 |
| 5,563,463 | A | * | 10/1996 | Stark ........................ 310/156.28 |
| 7,183,683 | B2 | * | 2/2007 | Shafer et al. ............. 310/156.28 |

(Continued)

FOREIGN PATENT DOCUMENTS

| | | |
|---|---|---|
| JP | 61-108080 | 7/1986 |
| JP | 02-223342 | 9/1990 |

(Continued)

*Primary Examiner* — John K Kim
(74) *Attorney, Agent, or Firm* — Drinker Biddle & Reath LLP

(57) ABSTRACT

In accordance with the present invention, a rotor of an electric motor including a rotor core, a plurality of magnets spaced apart from each other on an outer circumferential surface of the rotor core, and a cylindrical protective pipe surrounding the magnets is provided. The protective pipe has an inner diameter smaller than a diameter of a circumscribed circle passing through tops of outer surfaces of the magnets. A space defined by an inner surface of the protective pipe, the outer surfaces of the magnets and the outer surface of the rotor core is filled with resin, and the protective pipe is held so as to have a diameter larger than that of the circumscribed circle, due to injection pressure of the resin.

13 Claims, 9 Drawing Sheets

(56) References Cited

U.S. PATENT DOCUMENTS

| | | | |
|---|---|---|---|
| 7,741,747 B2* | 6/2010 | Yamamura et al. | 310/156.28 |
| 8,413,315 B2* | 4/2013 | Yamamura et al. | 29/598 |
| 2009/0001839 A1* | 1/2009 | Masayuki et al. | 310/156.16 |
| 2009/0267438 A1* | 10/2009 | Murakami | 310/156.28 |
| 2010/0244607 A1* | 9/2010 | Fujimoto et al. | 310/156.21 |
| 2012/0001510 A1* | 1/2012 | Uni et al. | 310/156.28 |
| 2012/0025654 A1* | 2/2012 | Bach et al. | 310/156.31 |
| 2013/0214620 A1* | 8/2013 | Kobayashi et al. | 310/43 |

FOREIGN PATENT DOCUMENTS

| | | |
|---|---|---|
| JP | 03-074151 | 3/1991 |
| JP | 2005-117732 | 4/2005 |
| JP | 2009-095200 A | 4/2009 |
| JP | 2009-106065 A | 5/2009 |
| JP | 2012-016236 | 1/2012 |

* cited by examiner

ROTOR OF ELECTRIC MOTOR HAVING STRUCTURE FOR ATTACHING MAGNET SECURELY TO OUTER CIRCUMFERENTIAL SURFACE OF ROTOR CORE AND MANUFACTURING METHOD THEREOF

RELATED APPLICATION DATA

This application claims priority under 35 U.S.C. §119 and/or §365 to Japanese Application No. 2012-031604 filed Feb. 16, 2012, the entire contents of which is incorporated herein by reference.

BACKGROUND OF THE INVENTION

1. Field of the Invention

The present invention relates to a rotor of an electric motor having a structure for attaching magnets securely to a circumferential surface of an iron core, and to a manufacturing method thereof.

2. Description of the Related Art

In a rotor of an electric motor in which magnets are arranged on an outer circumferential surface of an iron core, adhesive is used in order to attach the magnets to the core. However, if adhesive is used, the amount and hardening of the adhesive have to be managed, so that cost tends to increase and quality control will be difficult. Further, not only is a cleaning step required to clean the surface of the core before adhesive is applied thereto, but an additional step is required to remove excess adhesive after the adhesive is applied. Moreover, magnets attached by means of adhesive make it difficult to ensure that the fixing structure has enough strength to withstand torque and centrifugal force during rotational movement of the electric motor.

A rotor in which a protective pipe is provided so as to surround the outer circumferences of magnets so that an inner surface of the protective pipe and an outer surface of the magnets are brought into close contact with each other has been known (see JP-A-2009-106065). A rotor in which resin is filled in a gap defined between a protective pipe and a core has also been known (JP-A-2009-95200). However, in the structure in which resin is simply filled in the gap between the protective pipe and the core, it is difficult to ensure that the magnets are stably brought in close contact with the core. As a result, mechanical or magnetic balance cannot be maintained, and therefore, rotor balance is impaired. There also arises a problem due to cogging.

Therefore, there is a need for a rotor of an electric motor that allows magnets to be reliably and stably fixed to an outer circumferential surface of a core without use of adhesive, and a manufacturing method for manufacturing such a rotor of an electric motor.

SUMMARY OF THE INVENTION

In accordance with a first invention of the present application, a rotor of an electric motor is provided. The rotor comprises a rotor core, a plurality of magnets spaced apart from each other on an outer circumferential surface of the rotor core, and a cylindrical protective pipe provided so as to surround the plurality of magnets, wherein the protective pipe has an inner diameter smaller than a diameter of a circumscribed circle passing through tops of outer surfaces of the plurality of magnets, and wherein a space defined by an inner surface of the protective pipe, the outer surfaces of the plurality of magnets and the outer surface of the rotor core is filled with resin, the protective pipe being held under injection pressure of the resin, so as to increase in diameter and have an inner diameter larger than a diameter of the circumscribed circle.

In accordance with a second invention of the present application, the rotor of an electric motor as described in the first invention, wherein the protective pipe comprises an inward extension extending radially inwardly from at least one of ends of the protective pipe in an axial direction, is provided.

In accordance with a third invention of the present application, the rotor of an electric motor as described in the second invention, wherein a distal end of the inward extension is positioned radially outside the outer surface of the rotor core and radially inside the tops of the outer surfaces of the plurality magnets, is provided.

In accordance with a fourth invention of the present application, the rotor of an electric motor as described in the first invention, wherein the protective pipe comprises an outward extension extending radially outwardly from at least one of ends of the protective pipe in the axial direction, the outward extension having a curved portion at a base end of the outward extension, is provided.

In accordance with a fifth invention of the present application, the rotor of an electric motor as described in the fourth invention, wherein a distal end of the outward extension is positioned radially inside an inner surface of a stator that cooperates with the rotor, is provided.

In accordance with a sixth invention of the present application, the rotor of an electric motor as described in any one of the first to the fifth inventions, wherein the protective pipe is formed from a non-magnetic material, is provided.

In accordance with a seventh invention of the present application, the rotor of an electric motor as described in the sixth invention, wherein the protective pipe is formed from stainless steel, is provided.

In accordance with an eighth invention of the present application, the rotor of an electric motor as described in the seventh invention, wherein the protective pipe is formed by means of deep drawing, is provided.

In accordance with a ninth invention of the present application, the rotor of an electric motor as described in the seventh invention, wherein the protective pipe is formed by deep drawing followed by a heat treatment so as to recover ductility of the protective pipe, is provided.

In accordance with a tenth invention of the present application, the rotor of an electric motor as described in any one of the first to the ninth inventions, wherein the plurality of magnets are equally spaced apart from each other on the outer circumferential surface of the rotor core, is provided.

In accordance with an eleventh invention of the present application, the rotor of an electric motor as described in any one of the first to the tenth inventions, wherein the rotor core comprises a positioning mechanism for positioning the plurality of magnets in a circumferential direction of the rotor core, is provided.

In accordance with a twelfth invention of the present application, the rotor of an electric motor as described in any one of the first to the eleventh inventions, wherein the resin is injected by means of an injection molding machine, is provided.

In accordance with a thirteenth invention of the present application, a manufacturing method of manufacturing a rotor of an electric motor comprising a rotor core, a plurality of magnets spaced apart from each other on an outer circumferential surface of the rotor core, and a cylindrical protective pipe provided so as to surround the plurality of magnets is provided. The manufacturing method comprises: providing the plurality of magnets on the outer circumferential surface of the rotor core so as to be spaced apart from each other; preparing the protective pipe having an inner diameter smaller than a diameter of a circumscribed circle passing through tops of outer surfaces of the plurality of magnets; press-fitting the protective pipe onto the outer surfaces of the plurality of magnets so as to be in close contact therewith; preparing a die formed with a cavity having a circular cross section having a diameter larger than an outer diameter of the protective pipe; positioning the die such that the cavity of the die is concentric to the protective pipe; injecting resin into a space defined by the inner surface of the protective pipe, the outer surfaces of the plurality of magnets, and the outer surface of the rotor core; and increasing the diameter of the protective pipe under injection pressure, so that the outer diameter of the protective pipe matches the diameter of the cavity of the die.

These and other objects, features and advantages of the present invention will be more apparent in light of the detailed description of exemplary embodiments thereof as illustrated by the drawings.

DETAILED DESCRIPTION

Embodiments of the present invention will be described below with reference to the accompanying drawings. In the illustrated embodiments, each element may be modified in size from the practical application for better understanding.

Figure 1:
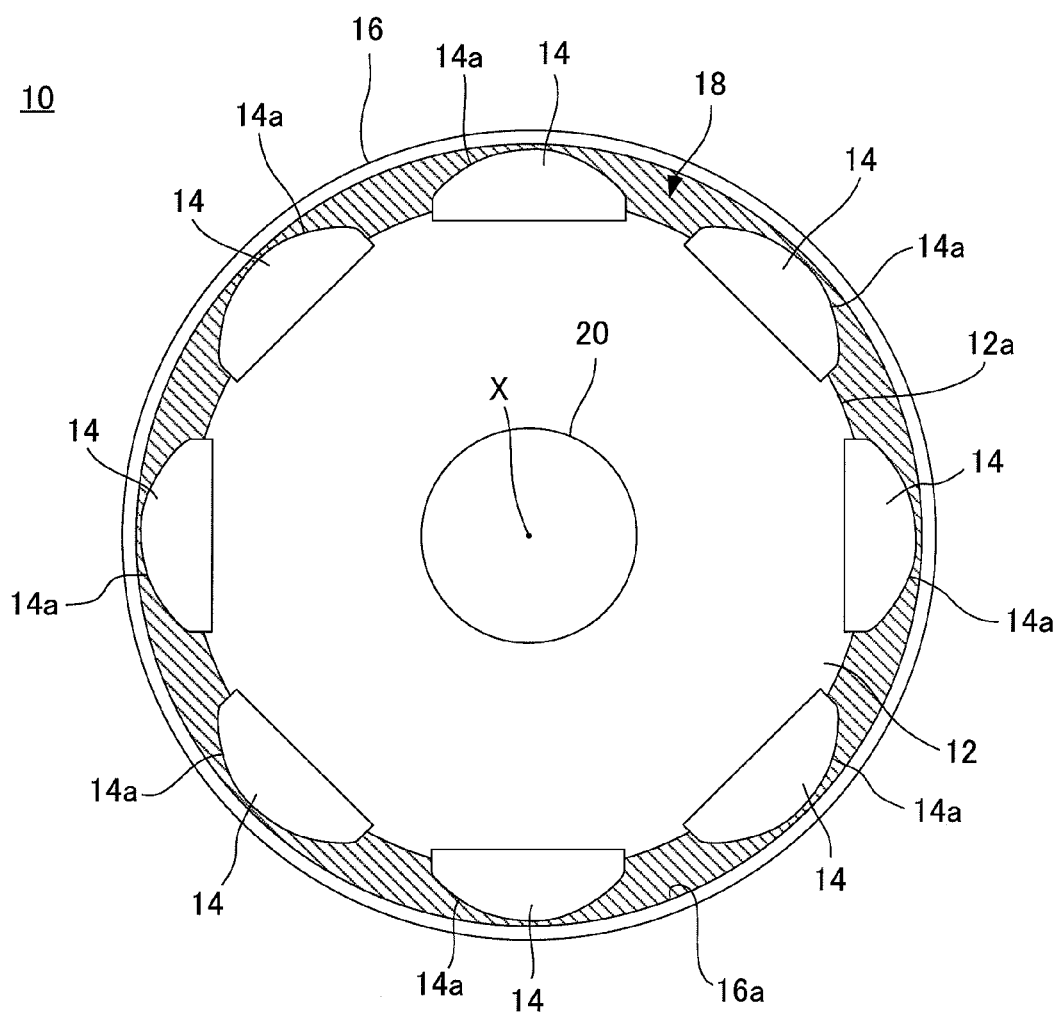
FIG. 1 is a sectional view schematically showing a rotor of an electric motor according to an embodiment of the present invention.
Figure 2:
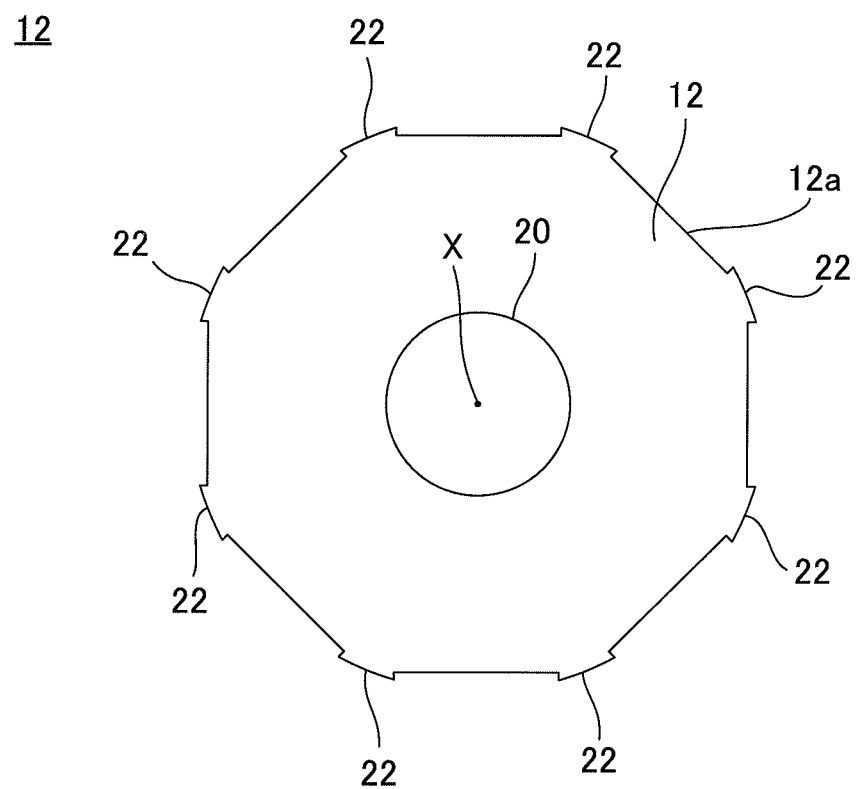
FIG. 2 is a sectional view showing only a rotor core in the embodiment of FIG. 1.
Figure 3:
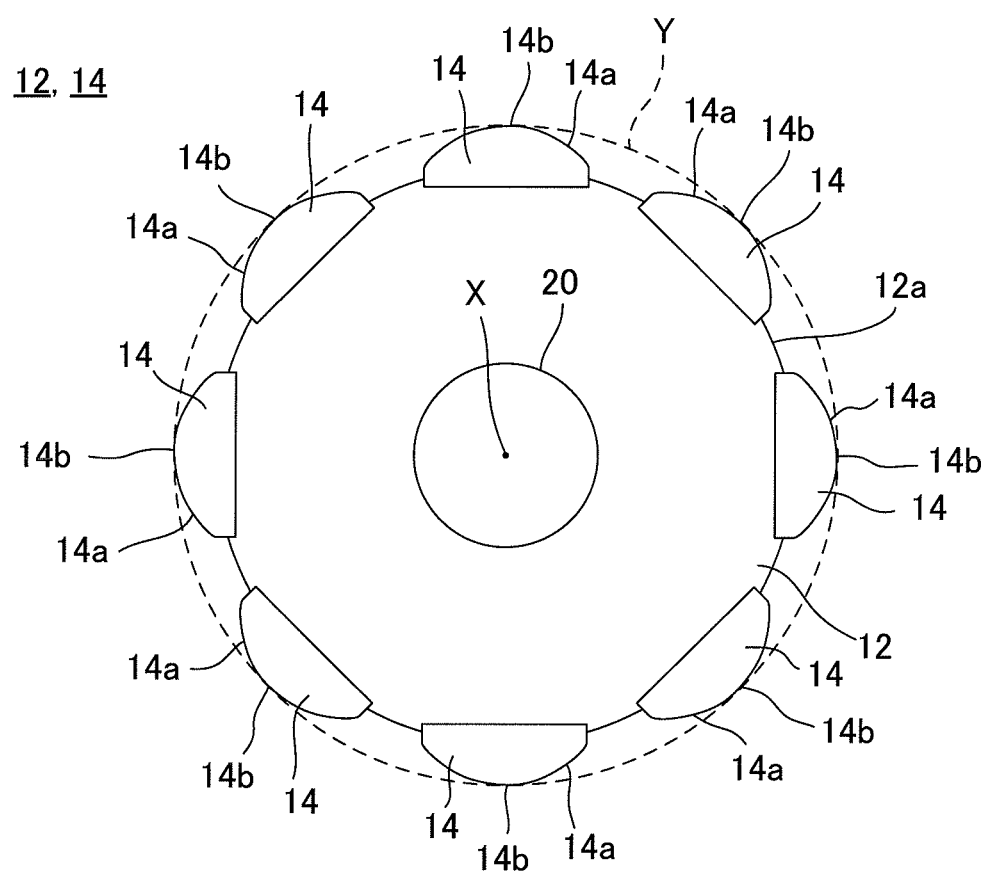
FIG. 3 is a sectional view showing the rotor core with magnets attached thereto in the embodiment of FIG. 1.

FIG. 1 is a sectional view schematically showing a rotor 10 of an electric motor according to an embodiment of the present invention. FIG. 2 is a sectional view showing only a rotor core 12 in the embodiment of FIG. 1. FIG. 3 is a sectional view showing the rotor core 12 with magnets 14 attached thereto in the embodiment of FIG. 1.

Figure 8:
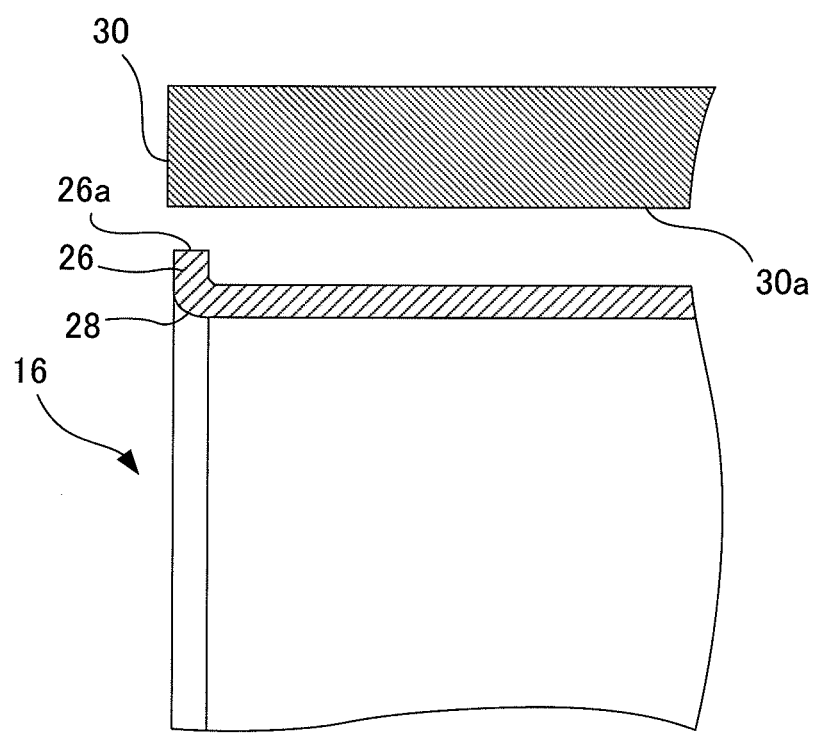
FIG. 8 is a partial sectional view to explain positions of the protective pipe and a stator of the electric motor relative to each other.

The rotor 10 is a constituent element of an electric motor that is driven rotationally due to a magnetic action in cooperation with a stator (see FIG. 8). The rotor 10 includes a rotor core 12, a plurality of magnets 14 spaced apart from each other on an outer circumferential surface 12a of the rotor core 12, and a cylindrical protective pipe 16 provided so as to surround the plurality of magnets 14. A space defined by an inner surface 16a of the protective pipe 16, outer surfaces 14a of the plurality of magnets 14, and an outer surface 12a of the rotor core 12 is filled with resin 18. In FIG. 1, a hatched area represents an area filled with the resin 18.

The rotor core 12 has a cross section of substantially polygonal shape as shown in FIG. 2. The rotor core 12 may be formed by stacking plates on top of another, for example. The plates may be made of a magnetic material and are punched into polygonal shapes. In a central portion of the rotor core 12, a shaft hole 20 is formed for receiving a rotational shaft (not shown). In the following description, "axial direction" refers to a direction perpendicular to the drawing plane of FIG. 1 through the center X of the shaft hole 20, while "radial direction" refers to a direction oriented from the center X of the shaft hole 20 toward the outer surface 12a of the rotor core 12.

The rotor core 12 has a positioning mechanism on the outer surface 12a for positioning magnets 14 in a circumferential direction of the rotor core 12. The positioning mechanism may be provided in various ways. For example, the positioning mechanism may be protrusions 22 projecting radially outwardly from the outer surface 12a of the rotor core 12 as shown in the drawing. Alternatively, the positioning mechanism may be formed by grooves extending on the outer surface 12a of the rotor core 12. The positioning mechanism may be an additional element separate from the rotor core 12, or an element integrally formed with the rotor core 12 as one unit. Such a positioning mechanism facilitates positioning of the magnets 14, and therefore, a process for arranging the magnets 14 in place becomes simple and easy. The positioning mechanism can also have an effect of preventing misalignment of the magnets 14 by preventing the magnets 14 from moving in a circumferential direction of the rotor core 12.

In the present embodiment, each of the plurality of magnets 14 is disposed between adjacent protrusions 22 and 22 of the rotor core 12, as illustrated in FIG. 3. The magnet 14 is substantially flat on a surface abutting on the rotor core 12, and substantially has the same width as a gap defined between the adjacent protrusions 22 and 22. The magnet 14 extends radially outwardly along the side surfaces of the protrusions 22. The magnets 14 has an outer surface 14a having a contour of substantially circular arc. Each magnet 14 is a permanent magnet such as neodymium magnet or ferrite magnet, and serves as a magnetic pole of the rotor 10. As will be described below, each magnet 14 is attached on the outer surface 12a of the rotor core 12 in close contact therewith (see FIG. 1). In a preferred embodiment, the magnets 14 are arranged so as to be spaced apart from each other in a circumferential direction of the rotor core 12. With the magnets 14 equally spaced apart from each other, a magnetic flux is evenly distributed in the circumferential direction, and therefore, there will be no fluctuation in rotational driving force. As a result, cogging can be effectively prevented from occurring.

Referring again to FIG. 1, the protective pipe 16 is provided so as to surround the magnets 14 on their outer circumferences. The protective pipe 16 has substantially the same length in an axial direction as the rotor core 12 and the magnets 14. The protective pipe 16 has an inner diameter smaller than a diameter of a circumscribed circle Y (see FIG. 3) passing through tops 14*b* of the outer surface 14*a* of the plurality of magnets 14. FIG. 1 shows the state where the protective pipe 16 has an increased diameter under influence of the injection pressure of the resin 18 as the resin 18 is injected, as will be described below. Accordingly, the protective pipe 16 as illustrated has an inner diameter larger than the diameter of the circumscribed circle Y.

The protective pipe 16 is preferably formed from a non-magnetic material. With the protective pipe 16 formed from a non-magnetic material, magnetic flux can be prevented from leaking from the magnets 14, and therefore, an increased output torque can be achieved. In one embodiment, the protective pipe 16 is formed from stainless steel. Since stainless steel has high strength and is light weight, it is preferably applied to the protective pipe 16 of the rotor 10. The protective pipe 16 can be formed by various known methods. For example, the protective pipe 16 can be formed by rolling a sheet material into a cylindrical shape and welding together edges of the sheet material opposite to each other. The protective pipe 16 can also be formed from a sheet material by means of deep drawing. It is advantageous since deep drawing allows the protective pipe 16 to be formed in a relatively shorter time. When the protective pipe 16 is formed by deep drawing, it is desirable to apply a heat treatment such as annealing. By applying a heat treatment, brittleness after deep drawing can be improved, and therefore, ductility of the protective pipe 16 can be restored. As a result, when the magnets 14 are press-fitted and the protective pipe 16 is subject to deformation, and when resin 18 is injected so as to enlarge the diameter of the protective pipe 16 with injection pressure of the resin 18, possible damages to the protective pipe 16 can be avoided.

In the present embodiment, the protective pipe 16 is held so as to have an increased diameter larger than its original shape due to injection pressure of the resin 18, as described above. Therefore, in the state as shown in FIG. 1, the protective pipe 16 is subjected to restoring force which acts radially inwardly in order to decrease the diameter of the protective pipe 16. Since the resin 18 is filled in the space between the protective pipe 16, the magnets 14 and the rotor core 12, urging force acts on the magnets 14 due to the restoring force of the protective pipe 16, so as to press the magnets 14 against the rotor core 12. In the present embodiment, close contact between the magnets 14 and the rotor core 12 can be maintained by the urging force acting on the magnets 14 in a radially inward direction.

Figure 4:
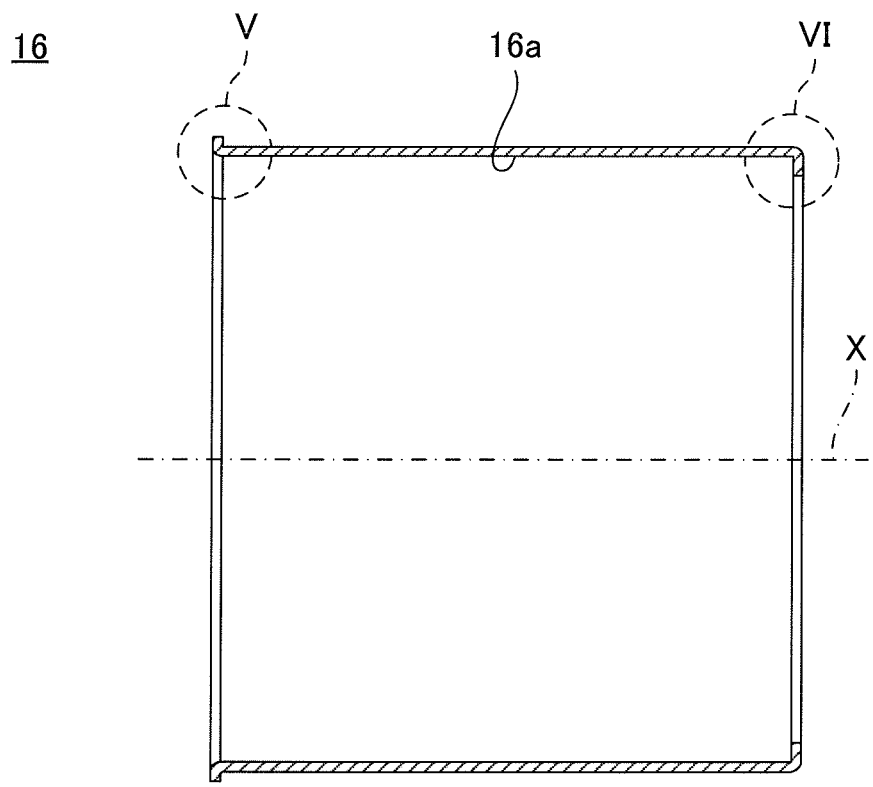
FIG. 4 is a sectional view schematically showing a protective pipe according to an embodiment of the present invention.
Figure 5:
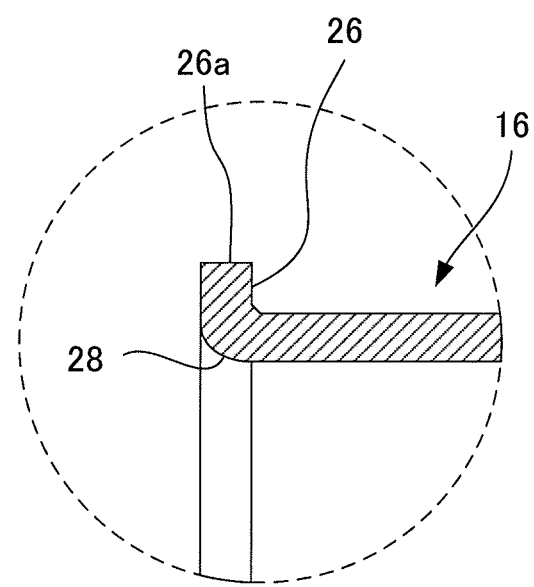
FIG. 5 is a partial enlarged view schematically showing a portion V in FIG. 4.
Figure 6:
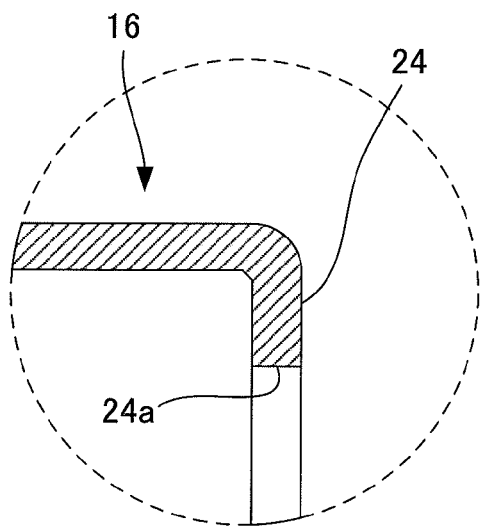
FIG. 6 is a partial enlarged view schematically showing a portion VI in FIG. 4.
Figure 7:
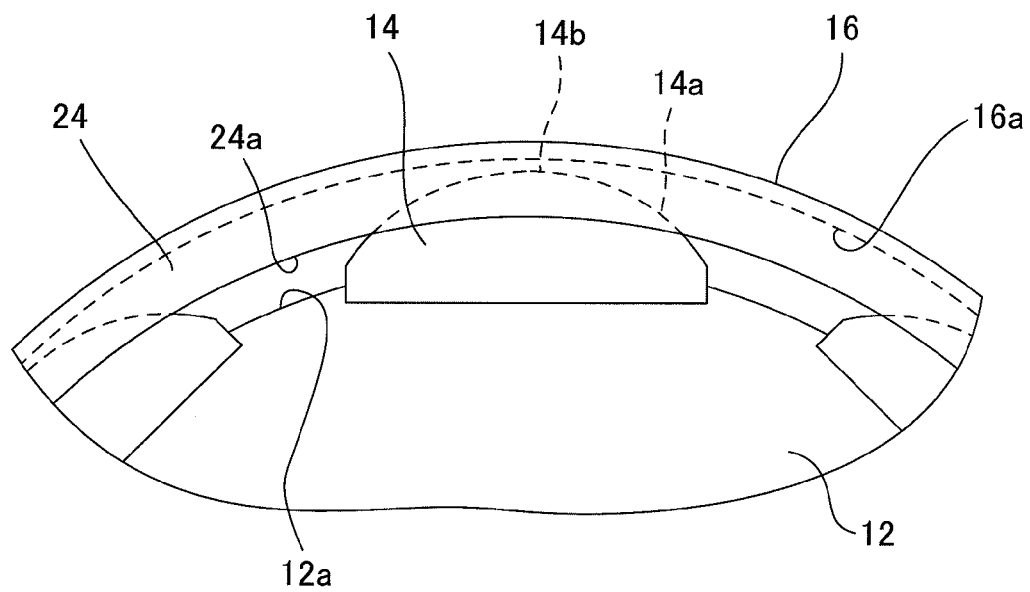
FIG. 7 is a partial side view to explain an inward extension formed on the protective pipe.

Next, referring to FIGS. 4 to 8, a protective pipe 16 according to an embodiment including additional and optional features will be described. FIG. 4 is a sectional view schematically showing the protective pipe 16 according to an embodiment of the present invention. FIG. 5 is a partial enlarged view schematically showing a portion V in FIG. 4. FIG. 6 is a partial enlarged view schematically showing a portion VI in FIG. 4. FIG. 7 is a partial side view to explain an inward extension 24 formed on the protective pipe 16. FIG. 8 is a partial sectional view to explain positions of the protective pipe 16 and a stator 30 of the electric motor relative to each other.

As clearly shown in FIG. 7, the protective pipe 16 has an inward extension 24 extending in a radially inward direction of the protective pipe 16 from one end in an axial direction X of the protective pipe 16. Also, as clearly shown in FIG. 5, the protective pipe 16 has an outward extension 26 extending in a radially outward direction of the protective pipe 16 at an end opposite to the end where the inward extension 24 is provided.

The inward extension 24 can be formed by bending the end of the protective pipe 16 radially inwardly over the entire circumference. The distal end 24*a* of the inward extension 24 is oriented in a radially inward direction. The protective pipe 16 having the inward extension 24 has increased structural strength, as compared to that having a simple cylindrical shape. In addition, the inward extension 24 allows resin 18 to be filled, under sufficient injection pressure, up to the end of the protective pipe 16 in the axial direction X, so that the magnets 14 can be prevented from being misaligned in the axial direction X. The inward extension 24 is formed as illustrated in FIG. 7 such that the distal end 24*a* of the inward extension 24 is positioned radially outside the outer surface 12*a* of the rotor core 12 and radially inside the tops 14*b* of the outer surfaces 14*a* of the plurality of magnets 14. With such positioning of the distal end 24*a* of the inward extension 24, the gap intended to be filled with resin 18 can be visually observed from the side where the inward extension 24 is provided. Therefore, an injection process of resin 18 can be performed, while an operational condition visually observed. Further, with the above configuration of the inward extension 24, it can be easily determined whether or not misalignment of the magnets 14 occurs.

Referring again to FIG. 5, the outward extension 26 is formed by bending an end of the protective pipe 16 radially outwardly over the entire circumference. The distal end 26*a* of the outward extension 26 is oriented in a radially outward direction. The outward extension 26 prevents resin 18 from leaking from the end of the protective pipe 16 to the outer circumferential surface, even if positions at which resin 18 are injected relative to the above-mentioned gap is shifted. The outward extension 26 has a curved portion 28 curved radially outwardly at the base end of the outward extension 26. The curved portion 28 facilitates introduction of the magnets 14 when the magnets 14 is press-fitted between the rotor core 12 and the protective pipe 16, and therefore, the press-fitting operation can be simplified. In addition, when the protective pipe 16 is press-fitted onto the outer circumferences of the magnets 14 arranged on the rotor core 12, the press-fitting operation can be simplified.

As shown in FIG. 8, the outward extension 26 has the distal end 26*a* positioned radially inside the inner surface 30*a* of the stator 30 of the electric motor. More specifically, the distal end 26*a* of the outward extension 26 is provided so as to have a certain gap between the inner surface 30*a* of the stator 30 such that, even if the protective pipe 16 is pulled and deformed to extend radially outwardly due to centrifugal force as the rotor 10 is in rotational movement, the distal end 26*a* of the outward extension 26 does not come into contact with the inner surface 30*a* of the stator 30. Further, with such positioning of the distal end 26*a* of the outward extension 26, when the rotor 10 and the stator 30 are assembled together, they would not interfere with each other, and therefore, an assembling process can be smoothly carried out, and it is ensured that the rotor 10 can rotate without coming into contact with the stator 30.

The inward extension 24 and the outward extension 26 may be formed in advance before the protective pipe 16 is mounted onto the outer circumferences of the magnets 14, or may also be formed by bending the end of the protective pipe 16 after the protective pipe 16 is mounted. With reference to the illustrated embodiment, the configuration in which the inward extension 24 is formed at one end of the protective pipe 16 and the outward extension 26 is formed at the other end of the protective pipe 16 has been explained. However, the present invention is not limited to this particular embodiment. For example, configuration in which either the inward extension 24 or the outward extension 26 is formed only at one end of the protective pipe 16 and neither the inward extension 24 nor the outward extension 26 is formed at the other end may also fall within the scope of the present invention. Alternatively, either the inward extension 24 or the outward extension 26 may be formed at both ends of the protective pipe 16, respectively.

Figure 9:
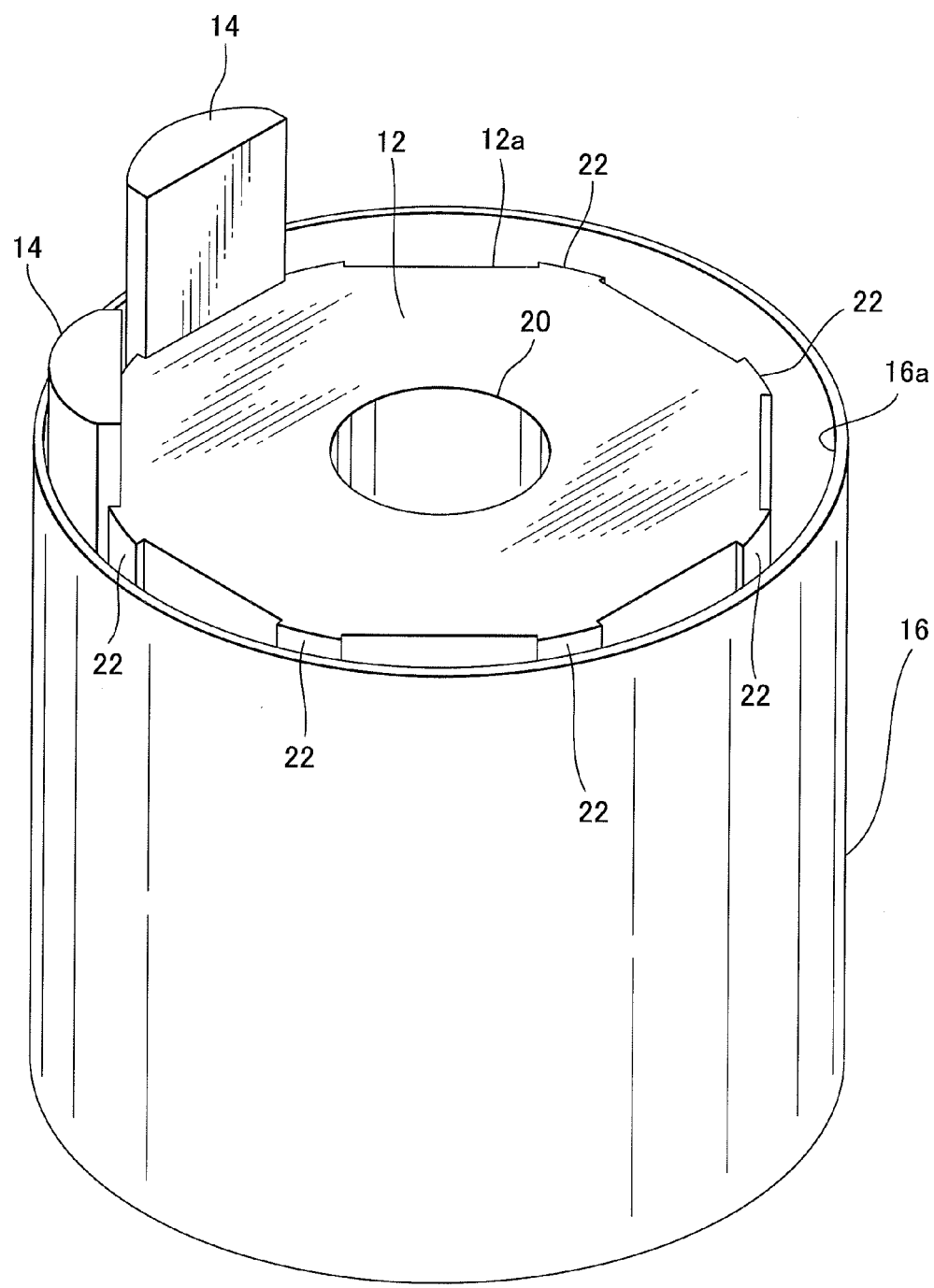
FIG. 9 is a perspective view schematically showing a process of press-fitting magnets in a manufacturing method of a rotor of an electric motor according to an embodiment of the present invention.
Figure 10:
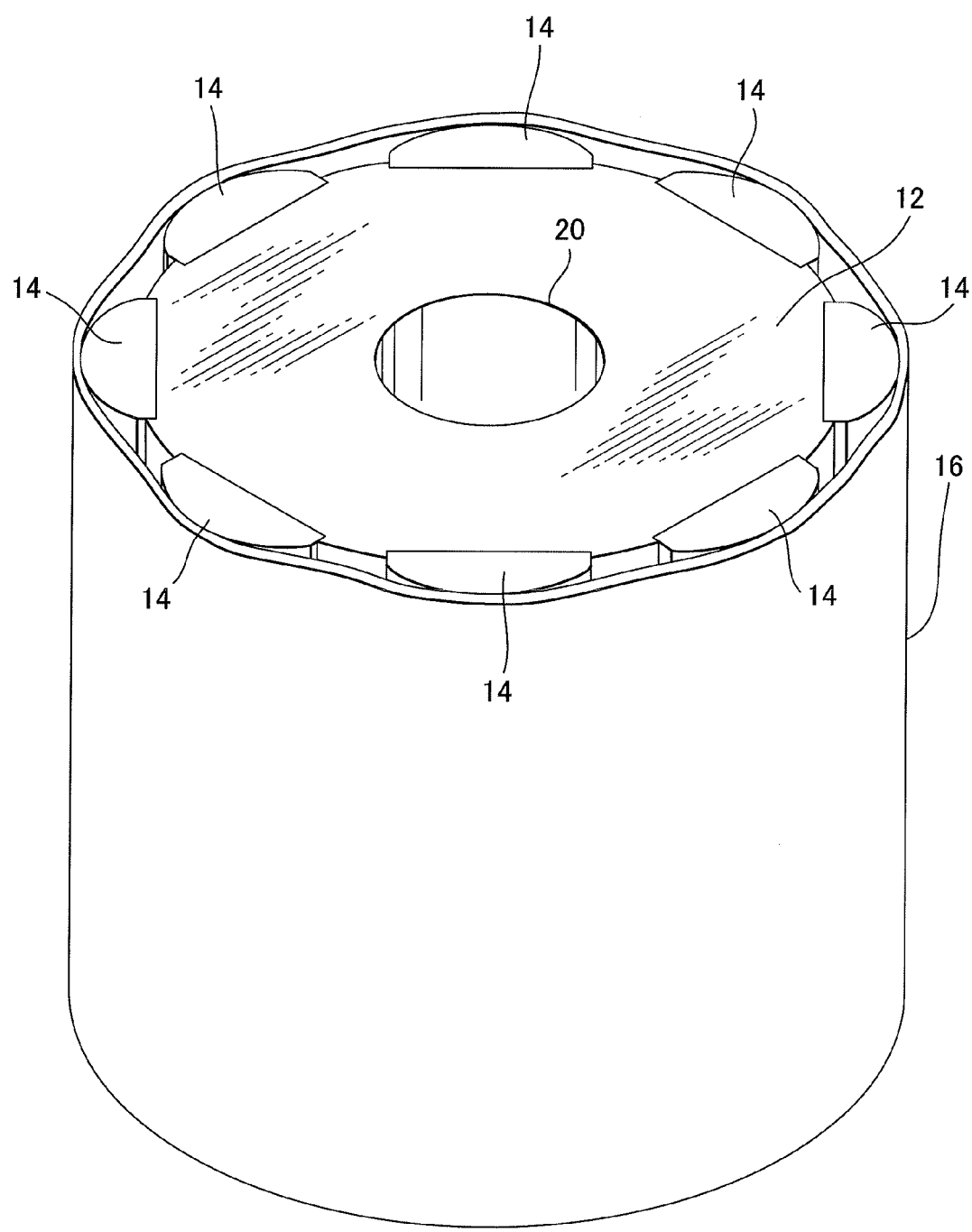
FIG. 10 is a perspective view showing the state before resin is injected in the manufacturing method of a rotor of an electric motor according to an embodiment of the present invention.
Figure 11:
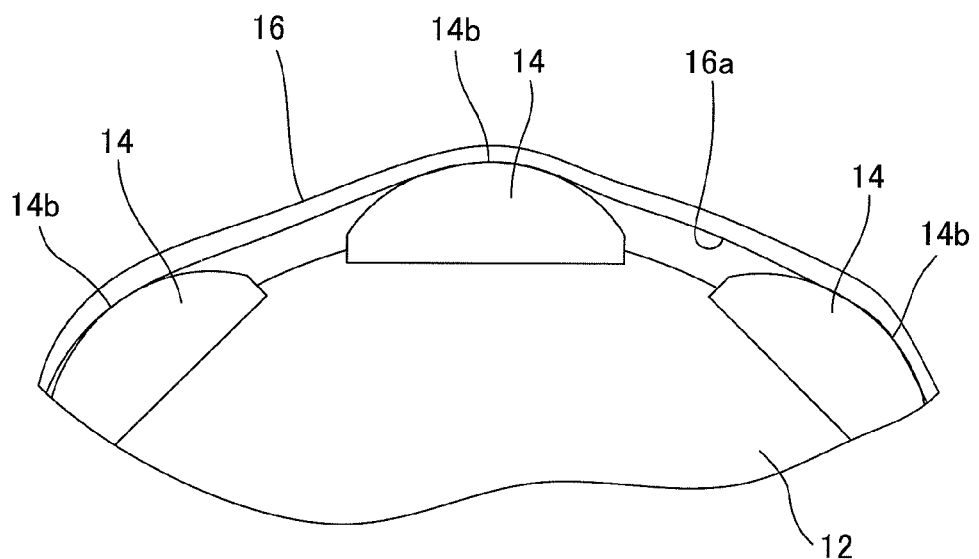
FIG. 11 is a partial enlarged view schematically showing positions of the rotor core, the magnets and the protective pipe relative to one another before resin is injected, in the manufacturing method of a rotor of an electric motor according to an embodiment of the present invention.
Figure 12:
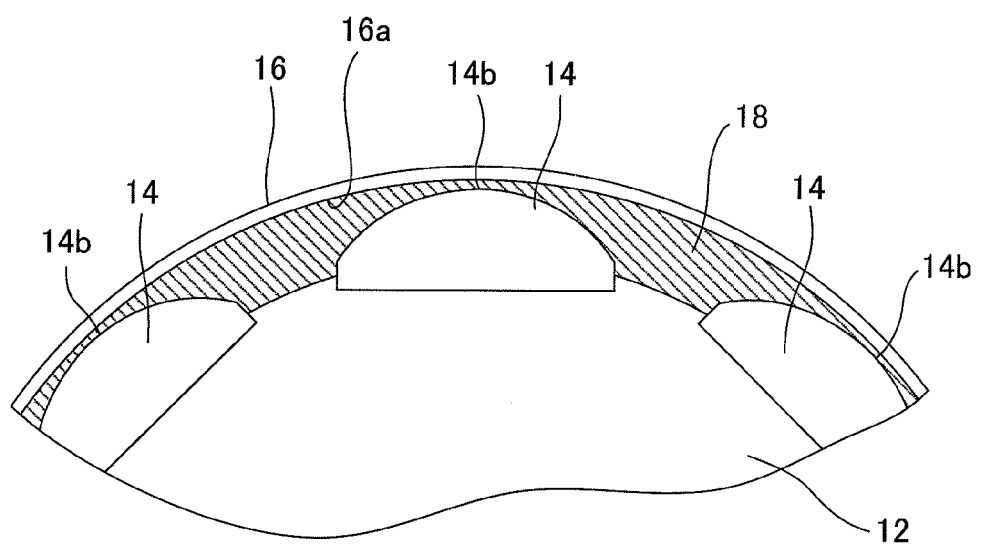
FIG. 12 is a partial enlarged view schematically showing positions of the rotor core, the magnets and the protective pipe after resin is injected, in the manufacturing method of a rotor of an electric motor according to an embodiment of the present invention.

Referring to FIGS. 9 to 12, a manufacturing method for manufacturing the rotor 10 according to an embodiment of the present invention will be described. FIG. 9 is a perspective view schematically showing a step of press-fitting of the magnets 14. FIG. 10 is a perspective view showing a state before the resin 18 is injected. FIG. 11 is a partial enlarged sectional view schematically showing positions of the rotor core 12, the magnets 14 and the protective pipe 16 relative to one another before resin 18 is injected. FIG. 12 is a partial enlarged sectional view schematically showing positions of the rotor core 12, the magnets 14 and the protective pipe 16 relative to one another after resin 18 is injected.

First, the rotor core 12 and the protective pipe 16 having the configuration described above are arranged concentrically to each other. As described above, the inner diameter of the protective pipe 16 is smaller than the diameter of a circumscribed circle Y (see FIG. 3) passing through the tops of the outer surfaces 14*a* of the magnets 14 attached to the rotor core 12, and is sufficiently larger than the outer diameter of the rotor core 12. As shown in FIG. 9, while the magnets 14 are arranged in the gaps between the protrusions 22 and 22 on the rotor core 12, the magnets 14 are press-fitted between the rotor core 12 and the protective pipe 16. Upon press-fitting of the magnets 14, the protective pipe 16 is expanded radially outwardly by the tops 14*b* of the magnets 14, so as to deform as shown in FIGS. 10 and 11.

Then, resin 18 is injected into the space defined by the rotor core 12, the magnets 14 and the protective pipe 16. Resin 18 is injected into the above space by means of an injection molding machine, which is not shown. During the injection process, a metal die (not shown) formed with a cavity may be preferably used to limit an amount of deformation of the protective pipe 16. For example, the cavity of the die may have a circular cross section, i.e., have a cylindrical shape of a diameter larger than the outer diameter of the protective pipe 16. If such a die is provided around the protective pipe 16 at the time of the injection, the protective pipe 16 is deformed radially outwardly, due to the injection pressure of resin, only to the extent that the protective pipe has an increased diameter up to the predetermined diameter of the cavity. In other words, it is only necessary for injection pressure to be adjusted so that the outer diameter of the protective pipe 16 matches the diameter of the cavity. Therefore, the process can be easily managed. In this way, in accordance with the present embodiment, it is ensured by a relatively simple manner that the protective pipe 16 is deformed in the radially outward direction to a desirable extent.

In the above-described manufacturing method for manufacturing a rotor 10 of an electric motor, an exemplary embodiment in which the magnets 14 are press-fitted into the gap between the rotor core 12 and the protective pipe 16 has been explained. However, an alternative method in which the magnets 14 are temporarily attached to the rotor core 12 in advance (as shown in FIG. 3), and the protective pipe 16 is press-fitted so as to be in close contact with the outer surface 14*a* of the magnets 14, may also be adopted. In this case, a positioning mechanism such as the protrusions 22 formed on the rotor core 12 may be used to temporarily attach the magnets 14 to the rotor core 12, or an additional means for temporarily attachment may be provided. Since the alternative configuration is different from the above-described embodiment only in an order of the attaching procedure for attaching the magnets 14 and the protective pipe 16, it is evident that the alternative embodiment can also enjoy the same advantageous effect of the present invention as the above embodiment.

EFFECT OF THE INVENTION

In accordance with the first invention described above, resin is filled in the area formed by the protective pipe, the rotor core and the magnets, and urging force acts on the magnets in a radially inward direction due to restoring force of the protective pipe which has been expanded under injection pressure of resin. Therefore, it is ensured that the magnets are in close contact with the rotor core. Since no adhesive is necessary, management in relation to an amount of use of adhesive or a hardening condition is not required. In addition, a cleaning process of the rotor core and a removing process of adhesive can be omitted. As a result, production cost can be reduced.

In accordance with the second invention described above, by forming the inward extension at the end of the protective pipe, strength of the protective pipe can be increased. Further, the inward extension provides an effect of preventing the magnets from being misaligned in an axial position.

In accordance with the third invention described above, in the injecting process of the resin, a portion where resin is injected can be visually observed. Therefore, the operation can be carried out, while it is determined whether or not misalignment of the magnets occurs.

In accordance with the fourth invention described above, by forming the outward extension at the end of the protective pipe, the injected resin can be prevented from leaking to the outer circumference of the protective pipe.

In accordance with the fifth invention described above, since the outward extension is positioned radially inside the stator, it is ensured that rotational movement of the rotor is not hampered. Further, assembling the rotor and the stator together can be facilitated.

In accordance with the sixth invention described above, since the protective pipe is formed from a non-magnetic material, leakage of magnetic flux from the magnets can be prevented, and therefore, an output torque can be increased.

In accordance with the seventh invention described above, since the protective pipe is formed from stainless steel, the protective pipe which is light weight and has sufficient strength can be provided.

In accordance with the eighth invention described above, since the protective pipe is formed by means of deep drawing, productivity is improved and production cost can be reduced.

In accordance with the ninth invention described above, since ductility of the protective pipe is restored by a heat treatment, damages to the protective pipe can be effectively prevented.

In accordance with the tenth invention described above, since the magnets are arranged equally spaced apart from each other in a circumferential direction of the rotor core, magnetic flux can be evenly distributed. Therefore, no fluctuation is produced in rotational power and occurrence of cogging can be prevented.

In accordance with the eleventh invention described above, since a positioning mechanism is formed on the rotor core, a process for arranging the magnets on the rotor core can be simplified and the magnets can be prevented from being misaligned in a circumferential direction of the rotor core.

In accordance with the twelfth invention described above, since resin is injected by an injection molding machine, injection pressure required to increase the diameter of the protective pipe can be easily obtained without using any special additional equipment.

In accordance with the thirteenth invention described above, the magnets are attached so as to be in close contact with the rotor core by restoring force of the protective pipe whose diameter has been increased due to injection pressure of resin. Since no adhesive is necessary, an amount of use of adhesive or a hardening condition of adhesive do not have to be managed, and a cleaning process of the rotor core and a removing process of adhesive can be omitted. As a result, production cost can be reduced. In addition, since deformation of the protective pipe can be limited within the range corresponding to the diameter of the cavity of the die, the protective pipe can be adequately enlarged in diameter up to a desirable extent.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. A rotor of an electric motor comprising a rotor core, a plurality of magnets spaced apart from each other on an outer circumferential surface of the rotor core, and a cylindrical protective pipe provided so as to surround the plurality of magnets, wherein
    the protective pipe has an inner diameter smaller than a diameter of a circumscribed circle passing through tops of outer surfaces of the plurality of magnets, and wherein
    a space defined by an inner surface of the protective pipe, the outer surfaces of the plurality of magnets and the outer surface of the rotor core is filled with resin, the protective pipe being held under injection pressure of the resin, so as to increase in diameter and have an inner diameter larger than a diameter of the circumscribed circle.

2. The rotor of an electric motor according to claim 1, wherein the protective pipe comprises an inward extension extending radially inwardly from at least one of ends of the protective pipe in an axial direction.

3. The rotor of an electric motor according to claim 2, wherein a distal end of the inward extension is positioned radially outside the outer surface of the rotor core and radially inside the tops of the outer surfaces of the plurality magnets.

4. The rotor of an electric motor according to claim 1, wherein the protective pipe comprises an outward extension extending radially outwardly from at least one of ends of the protective pipe in the axial direction, the outward extension having a curved portion at a base end of the outward extension.

5. The rotor of an electric motor according to claim 4, wherein a distal end of the outward extension is positioned radially inside an inner surface of a stator that cooperates with the rotor.

6. The rotor of an electric motor according to claim 1, wherein the protective pipe is formed from a non-magnetic material.

7. The rotor of an electric motor according to claim 6, wherein the protective pipe is formed from stainless steel.

8. The rotor of an electric motor according to claim 7, wherein the protective pipe is formed by means of deep drawing.

9. The rotor of an electric motor according to claim 7, wherein the protective pipe is formed by deep drawing followed by a heat treatment so as to recover ductility of the protective pipe.

10. The rotor of an electric motor according to claim 1, wherein the plurality of magnets are equally spaced apart from each other on the outer circumferential surface of the rotor core.

11. The rotor of an electric motor according to claim 1, wherein the rotor core comprises a positioning mechanism for positioning the plurality of magnets in a circumferential direction of the rotor core.

12. The rotor of an electric motor according to claim 1, wherein the resin is injected by means of an injection molding machine.

13. A manufacturing method of manufacturing a rotor of an electric motor comprising a rotor core, a plurality of magnets spaced apart from each other on an outer circumferential surface of the rotor core, and a cylindrical protective pipe provided so as to surround the plurality of magnets,
    the manufacturing method comprises:
    providing the plurality of magnets on the outer circumferential surface of the rotor core so as to be spaced apart from each other;
    preparing the protective pipe having an inner diameter smaller than a diameter of a circumscribed circle passing through tops of outer surfaces of the plurality of magnets;
    press-fitting the protective pipe onto the outer surfaces of the plurality of magnets so as to be in close contact therewith;
    preparing a die formed with a cavity having a circular cross section having a diameter larger than an outer diameter of the protective pipe;
    positioning the die such that the cavity of the die is concentric to the protective pipe;
    injecting resin into a space defined by the inner surface of the protective pipe, the outer surfaces of the plurality of magnets, and the outer surface of the rotor core; and
    increasing the diameter of the protective pipe under injection pressure, so that the outer diameter of the protective pipe matches the diameter of the cavity of the die.

* * * * *